United States Patent [19]

Izumi et al.

[11] Patent Number: 5,075,085
[45] Date of Patent: Dec. 24, 1991

[54] DESULFURIZING METHOD FOR EXHAUST GAS FROM COMBUSTOR

[75] Inventors: Jun Izumi, Akunoura; Kazuaki Oshima; Seiichi Tanabe, both of Tokyo; Hiroyuki Tsutaya, Akunoura, all of Japan

[73] Assignee: Mitsubishi Jukogyo Kabushiki Kaisha, Tokyo, Japan

[21] Appl. No.: 521,271

[22] Filed: May 9, 1990

[30] Foreign Application Priority Data

May 15, 1989 [JP] Japan .................................. 1-118515

[51] Int. Cl.$^5$ ............................................. C01B 17/00
[52] U.S. Cl. ................................................... 423/242
[58] Field of Search .......... 423/242 A, 244 A, 244 R, 423/242

[56] References Cited

U.S. PATENT DOCUMENTS

| | | |
|---|---|---|
| 3,556,722 | 1/1971 | Owaki ................................ 423/242 |
| 3,840,638 | 10/1974 | Morita et al. ...................... 423/242 |
| 3,906,078 | 9/1975 | Hausberg et al. .................. 423/242 |

Primary Examiner—Gregory A. Heller
Attorney, Agent, or Firm—McAulay Fisher Nissen Goldberg & Kiel

[57] ABSTRACT

A method and equipment for desulfurizing exhaust gas from a combustor in which the exhaust gas containing $SO_2$ from the combustor is brought into contact with $SO_2$ absorbent to remove $SO_2$ and is blown down out of the system; on the other hand, the $SO_2$ absorbent absorbed $SO_2$ is brought into contact with air to desorb $SO_2$ and the air containing the desorbed $SO_2$ is supplied to the combustor as air for combustion to burn to raise the $SO_2$ concentration in the exhaust gas from the combustor; and the exhaust gas not undergone contact with the absorbent or a part of the air undergone contact with the $SO_2$ absorbent are taken out of the system.

2 Claims, 2 Drawing Sheets

DESULFURIZING METHOD FOR EXHAUST GAS FROM COMBUSTOR

FIELD OF THE INVENTION AND RELATED ART STATEMENT

The present invention relates to a method and equipment for desulfurizing exhaust gas from combustors such as a boiler, gas turbine, diesel engine, etc. using fuel containing sulfur such as coal and the like.

In the boiler, diesel engine, gas turbine, etc., due to S content in the fuel, $SO_2$ is produced in the exhaust gas. If the exhaust gas containing $SO_2$ is blown down out of the system, it causes environmental pollution such as photochemical smog and acid rain and therefore the blowdown is under a severe restriction. Because of fall in temperature of the exhaust gas occured when heat is exchanged, $SO_2$ reacts with oxygen and be converted into $SO_3$. Moreover, since $SO_3$ reacts with water at less than 200° C. to produce sulfuric acid which causes acid corrosion of the materials of the combustor, the heat exchange is very difficult at a temperature of the exhaust gas of less than 200° C.

For this reason, a variety of methods for desulfurization of the exhaust have been proposed so far. Among these, lime- gypsum method, one of wet-desulfurizing methods, is most widely used owing to (1) its treatment efficiency and (2) economical usability of by-product after treatment.

In this method, the exhaust gas, after being cooled to about 70° C. by spray of cooled water before being lowered to 200° C. at the temperature of which sulfuric acid dew point corrosion is progressed, is introduced into a gas-liquid contact tower where lime water circulates. Thus, $SO_2$ is removed as $CaSO_3$. $CaSO_3$ is air-oxidized, taken out as lime ($CaSO_4$) and used for building materials. The purified exhaust gas has a low temperature of 70° C. without enough power to go up through a chimney to be discharged and with a large quantity of white smoke and therefore the exhaust gas is burned more to raise its temperature up to about 100° C., and then is blown down out of the system. Thus, the lime-gypsum method provides a very high desulfurizing efficiency; however, if the exhaust gas has a temperature of less than 200° C., the heat collection cannot be made due to sulfuric acid dew point corrosion, and heat energy is required to raise the temperature of the gas after being treated resulting in decrease of process efficiency by 2–4% after all.

To sum up, the conventional wet-desulfurizing method, especially the lime-gypsum method has advantages of high desulfurizing efficiency and usability of by-product gypsum as building materials; on the other hand, because the desulfurizing temperature is a low 70° C., there are problems associated with heat balance and sulfuric acid dew point corrosion as listed below;

(1) $SO_2$ in exhaust gas from the combustion is condensed into the combustion materials in the form of $H_2SO_4$ resulting in sulfuric acid dew point corrosion.

(2) Heat collection is difficult when the temperature of exhaust gas is less than 200° C.

(3) The exhaust gas after being desulfurized has a low temperature of 70° C. and no power to go up through a chimney, with a large quantity of white smoke, and therefore, heat energy must be supplemented to raise the temperature up to about 100° C.

OBJECT AND SUMMARY OF THE INVENTION

It is an object of the present invention to provide a method and equipment for desulfurizing exhaust gas from a combustion having a high efficiency and cost effectiveness by overcoming problems of difficulty in heat collection at low temperature, of sulfuric acid dew point corrosion, etc., found in the conventional wet-desulfurizing methods.

The present invention provides a method and equipment for desulfurizing exhaust gas from a combustor in which the exhaust gas containing $SO_2$ from the combustor is brought into contact with $SO_2$ absorbent to remove $SO_2$ and is blown down out of the system; on the other hand, the $SO_2$ adsorbent adsorbed $SO_2$ is brought into contact with air to desorb $SO_2$ and the air containing the desorbed $SO_2$ is supplied to the combustor as air for combustion to burn to raise the $SO_2$ concentration in the exhaust gas from the combustor; and the exhaust gas not undergone contact with the adsorbent or a part of the air undergone contact with $SO_2$ adsorbent are taken out of the system.

In the present invention, by adsorbing $SO_2$ in the exhaust gas using adsorbent, the $SO_2$ content in the discharged gas is decreased and, at the same time, the collection of heat is performed even at the low temperature by overcoming the problem of sulfuric acid dew point corrosion and therefore the heat efficiency of the plant can be improved.

Moreover, by desorbing $SO_2$ adsorbed by $SO_2$ adsorbent with air and returning the air back to the combustor, and taking out the exhaust gas or a part of the air desorbed $SO_2$, the $SO_2$ concentration in the exhaust gas or in the air is raised resulting in a small-sized treatment equipment at the back current side and in a high treatment efficiency.

DETAILED DESCRIPTION OF PREFERRED EMBODIMENT

Figure 1:
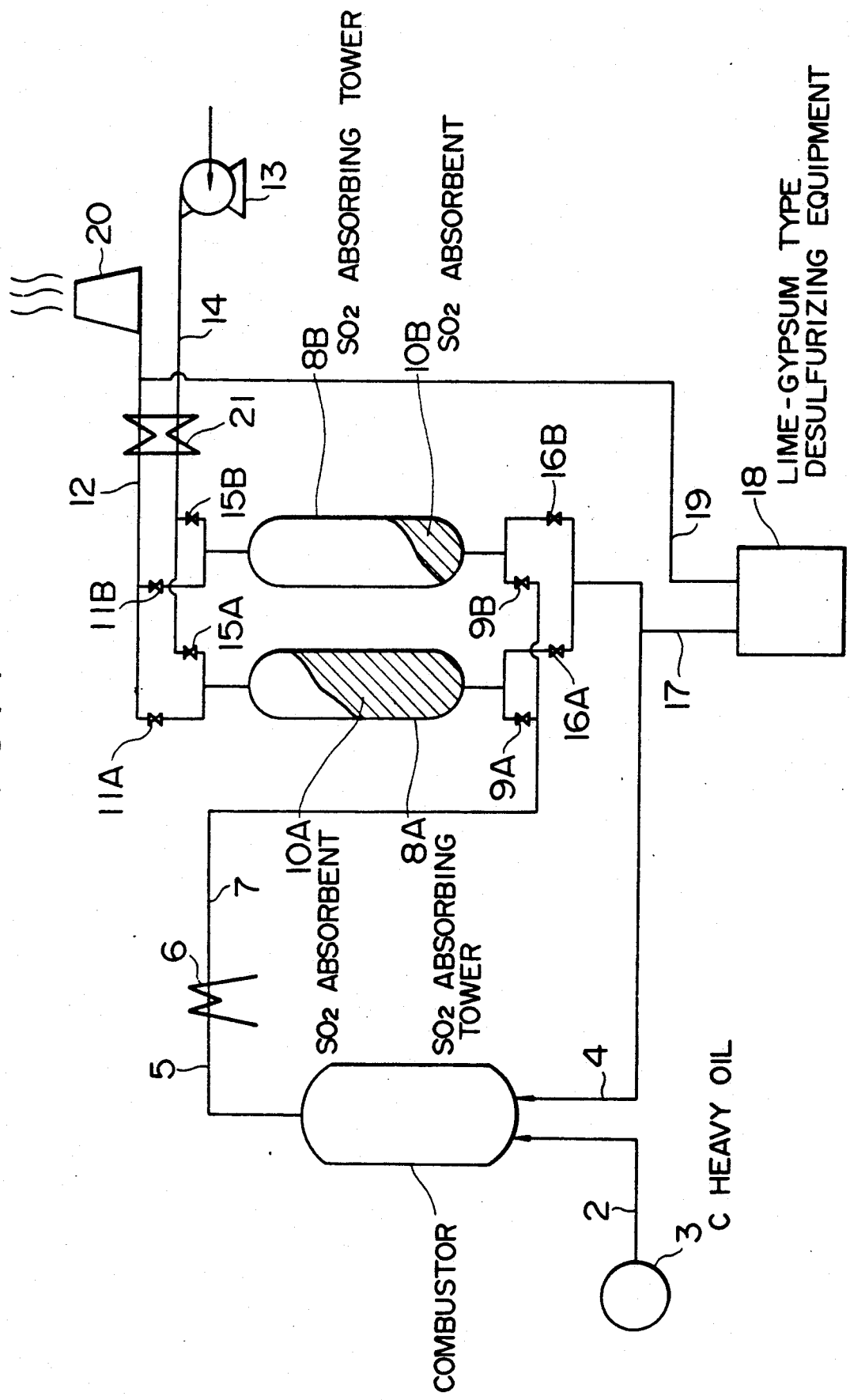
FIG. 1 is a conceptual illustration representing an embodiment of the desulfurizing method and equipment provided by the present invention.

In the present invention, by bringing the exhaust gas containing $SO_2$ from the combustor into contact with the $SO_2$ adsorbent, $SO_2$ is adsorbed in the $SO_2$ adsorbent in proportion to partial pressure in gas phase resulting in removal of $SO_2$ from the exhaust gas and the purified gas is blown down out of the system. When air is brought into contact with the adsorbent adsorbed $SO_2$, because the air contains almost no $SO_2$, the difference in $SO_2$ partial pressure between the adsorbent and the gas phase reactivates the adsorbent from which $SO_2$ has been desorbed. On the other hand, when the air containing $SO_2$ is supplied to the combustor as the air for combustion and burned, $SO_2$ in the air is combined with $SO_2$ resulted from S content in fuel to raise the $SO_2$ concentration in the exhaust gas after all. Furthermore, with an increase in the $SO_2$ concentration in the exhaust gas, the quantity of $SO_2$ to be adsorbed in the $SO_2$ adsorbent is increased, which accordingly raises the $SO_2$ concentration in the air desorbed $SO_2$ from the $SO_2$ adsorbent. The exhaust gas or a part of the air in which the $SO_2$ concentration has been raised is taken out of the system.

When attention is paid to the quantity of $SO_2$, it is confirmed that the quantity of $SO_2$ in the exhaust gas blown down after contact with the $SO_2$ adsorbent is very small. This means that all the quantity of $SO_2$ adsorbed by the $SO_2$ adsorbent is considered to be desorbed by the air. Then the air is supplied to the combustor, as the air for combustion, in which it helps the fuel containing the S content burn. Therefore, in this invention, a closed system regarding $SO_2$ is formed and only $SO_2$ contained in the exhaust gas or a part of the air discharged from the system is taken out of the system. The quantity of $SO_2$ is the value responding to that of the S content in fuel supplied to the combustor and, in a final stationary state, the S content in fuel supplied to the combustor is equal to the S content ($SO_2$) in the exhaust gas or in a part of the air discharged out of the system; i.e., if the gas flow taken out of the system is represented as $G_1(Nm^3/h)$, the concentration of $SO_2$ as $C_1$, and the S content contained in fuel supplied to the combustor as $n_s(K_g\text{-mol}/h)$, the following formulae are given in the final stationary state.

$$G_1C_1 = n_s \times 22.4$$

$$C_1 = n_s \times 22.4/G_1$$

The concentration of $SO_2$ taken out of the system is equal to that of the air supplied to the combustor or blown down from the combustor and therefore the $SO_2$ concentration in the present invention is represented as $n_s \times 22.4/ G_1$ finally. This means that, if 10% of the exhaust gas or the air containing $SO_2$ is taken out from the $SO_2$ closed system by the present invention, the concentration of $SO_2$ in the exhaust gas is raised 10 times than that in the ordinary combustion. Thus, in the present invention, the exhaust gas containing almost no $SO_2$ owing to adsorption by the adsorbent and the condensed exhaust gas or air, each having high $SO_2$ concentration, can be obtained.

As explained above, in the present invention, the discharged exhaust gas contains almost no $SO_2$ because $SO_2$ has been adsorbed in the adsorbent and therefore there is no problem associated with sulfuric acid dew point corrosion; and the collection of heat can be made even while the temperature of the discharged exhaust gas is low resulting in a great improvement of plant efficiency and, moreover, the $SO_2$ concentration of the discharged exhaust gas is reduced to a level satisfying regulations.

On the other hand, when attention is paid to the exhaust gas or a part of air, each having high $SO_2$ concentration, as the quantity of the gas taken out is small and the speed of adsorption rises with an increase of $SO_2$ concentration, the quantity of gas treated by the desulfurizing equipment is increased and the cost for the equipment is greatly reduced. Furthermore, when $SO_2$ is desorbed from the $SO_2$ adsorbent, if the air with almost the same quantity as or more than the exhaust gas is brought into contact with the $SO_2$ adsorbent, the required quantity of air for combustion is obtained.

Acid-resisting alumina, zeolite with high silica alumina base, etc. are suitable for the $SO_2$ adsorbent to be used in the present invention. In order to avoid the effect of pore closing of the adsorbent due to existence of sulfuric acid at a low temperature and prohibit a decrease of adsorbing capability at a high temperature, the desired temperature of the exhaust gas at the time of contact with the $SO_2$ absorbent is 150°–600° C.

The embodiment of the desulfurizing method and equipment provided by the present invention is described by FIG. 1 as under.

The combustor 1 is a heavy oil exclusive burning boiler which produces exhaust gas of 3,000 $Nm^3/h$ and to which C heavy oil 3 as fuel is supplied from the fuel line 2 and air for combustion is sent from the passage 4 by premixing method, where the C heavy oil 3 is burnt to produce the exhaust gas containing $SO_2$ of 800 ppm. The exhaust gas is sent through the passage 5 to the heat exchangers, where the collection of heat is made, and through the passage 7 to the adsorbing towers 8A and 8B.

Each of the adsorbing towers 8A and 8B is filled with the acid-resisting adsorbents 10A and 10B such as active alumina, zeolite with high silica alumina base, etc. The bottoms of the adsorbing towers 8A and 8B are connected through the valves 9A and 9B to the above-mentioned passage 7. Moreover, the tops of the adsorbing towers 8A and 8B are connected through the valves 11A and 11B to the passage 12 which connects with the chimney 20 and also through the valves 15A and 15B to the passage 14 which connects with the push fan 13. The heat exchanger 21 is equipped between the above-mentioned passage 12 and 14. The bottoms of 8A and 8B are connected through the valves 16A and 16B to the passage 4. The passage 17 diverges from the passage 4 and is connected to the lime-gypsum type desulfurizing equipment 18, the outlet of which is connected through the passage 19 to the lower current side of the heat exchanger 21 which connects with the passage 12.

Here, it is assumed that the $SO_2$ adsorbing tower 8A is in the process of absorbing $SO_2$ with the valves 9A and 11A open and with the valves 15A and 16A closed, and the $SO_2$ adsorbing tower 8B is in the process of reactivation with the valves 9B and 11B closed and with the valves 15B and 16B open.

In the embodiment constructed as above, the exhaust gas containing $SO_2$ from the combustor 1 is introduced through the valve 9A to the $SO_2$ adsorbing tower 8A, where the $SO_2$ content of the gas is adsorbed and removed by the $SO_2$ adsorbent, and then is sent from the top of the tower, through the valve 11A and the passage 12, to the chimney 20, from which it is blown down out of the system as cleaned exhaust gas. At this time, the temperature within the adsorbing tower 8A is maintained between 150° C. and 600° C. At the same time, the air of almost the same quantity as the exhaust gas, pressurized down to about 1,000 mmAq by the push fan 13, through the passage 14 and the valve 15B, flows and passes countercurrently in the $SO_2$ adsorbing tower 8A. Moreover, this air, desorbing $SO_2$ adsorbed by the adsorbent 10B into the gas phase, continues to flow and pass to reactivate the adsorbent 10B and is supplied, as the air containing $SO_2$, through the valve 16B and the passage 4 to the combustor 1 to burn the fuel 3. The $SO_2$ content in the air is mixed with $SO_2$ produced from the S content in the fuel resulting in an increase of the $SO_2$ concentration in the exhaust gas.

On the other hand, a part of the air (10%) containing $SO_2$ is sent from the passage 4 through the passage 17 to the lime-gypsum type desulfurizing equipment 18 to produce gypsum. The purified gas after being treated is blown down from the chimney 20 through the passages 19 and 12.

When the adsorbing tower 10A reaches the state of saturation as a result of gradual adsorption of $SO_2$ and the reactivation of the adsorbing tower 10B is completed, the valve is switched to reactivate the adsorbing tower 10A in turn and to put the adsorbing tower 10B in the process of $SO_2$ adsorption, thus achieving consecutive combustion and adsorption and desorption of $SO_2$.

In this embodiment, the quantity of $SO_2$ in the exhaust gas discharged from the adsorbing towers 10A and 10B is very small and can be negligible; therefore, a closed system is formed because all amount of $SO_2$ adsorbed in the adsorbing tower is returned back to the combustor and $SO_2$ taken out of the system is limited to $SO_2$ to be supplied through the passage 17 to the lime-gypsum type desulfurizing equipment 18.

Accordingly, in a final stationary state, the quantity of $SO_2$ is equivalent to that of $SO_2$ produced from the S content contained in fuel to be supplied to the combustor 1 is considered to be taken out of the system through the passage 17. For this reason, as explained above, the $SO_2$ concentration in a stationary state in the air within the passage 17, i.e., the $SO_2$ concentration in the stationary state in the air within the passage 14 is given as $22.4 n_s/G_1$ and, as a result, the $SO_2$ concentration in the exhaust gas in the combustor is raised accordingly.

In the present embodiment, by taking out 10% of the exhaust gas from the diverged passage 17, the $SO_2$ concentration in the exhaust gas staying between the combustor 1 and the $SO_2$ adsorbing towers 8A and 8B is maintained at a definite value of 8,000 ppm after all. On the other hand, the $SO_2$ concentration in the air diverged by the passage 17 is also 8,000 ppm. The air with a flow rate of 300Nm$^3$/h, after its $SO_2$ content is removed in the lime-gypsum type desulfurizing equipment 18, is blown down, as purified gas, from the chimney 20. In view of the equipment, in the equipment to treat the exhaust gas of 300Nm$^3$/h, when compared with that of 3,000Nm$^3$/h type, the scale of the equipment is reduced to one fifths and, owing to a high $SO_2$ concentration of the gas treated, $SO_2$ is adsorbed with high efficiency.

Moreover, in the present embodiment, as described above, the heat exchange is made between the exhaust gas from which $SO_2$ content is adsorbed in the adsorbing towers 8A and 8B and the air in the heat exchanger 21, and the gas is preheated as a result. However, this exhaust gas contains almost no $SO_2$, there is no troublesome problem such as sulfuric acid dew point corrosion issue. Therefore, the heat exchange can be made until the temperature of the exhaust gas lowers to less than 200° C. resulting in improvement of heat efficiency of the plant and the exhaust gas can be discharged without additional burning.

In the present embodiment, no power generation is made; however, when a trial calculation is made by scaling up the embodiment to a plant to treat the exhaust gas of 1 million Nm$^3$/h by 350,000 KW, it is confirmed that, because the collection of heat is performed at a low temperature of the exhaust gas and the cost of heat source for raising the temperature of the exhaust gas after being desulfurized is reduced, the plant efficiency is improved by 3% in the end. Moreover, the utility of the $SO_2$ adsorbing tower is required only for the power to raise pressure equivalent to pressure loss of about 500mmAq and the normal utility for the combustor is also usable for other operations at the same time.

In the present embodiment, although the $SO_2$ concentration in the exhaust gas is 800 ppm in the ordinary burning in the combustor, because $SO_2$ from the $SO_2$ adsorbing tower joins in the combustor, the $SO_2$ concentration in the exhaust gas is raised up to 8,000 ppm.

Figure 2:
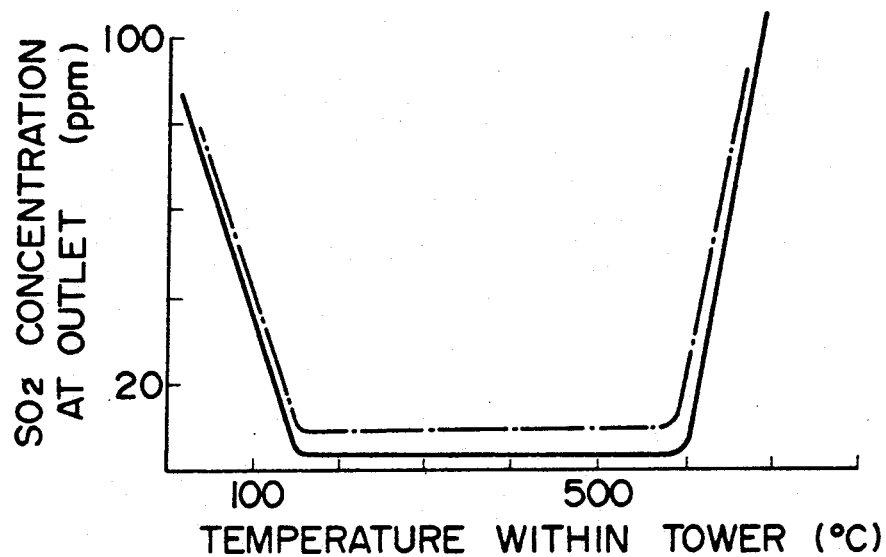
FIG. 2 is a graph showing the temperature in the $SO_2$ absorbing tower and the $SO_2$ concentration at the outlet of the $SO_2$ adsorbing tower in the embodiment illustrated in FIG. 1.

FIG. 2 represents the relation between the temperature with in the tower of the $SO_2$ adsorbing equipment in the present embodiment and the $SO_2$ concentration at the outlet of the absorbing tower when 1 ton of the $SO_2$ adsorbent is used. A full line shows the result obtained from the case where active alumina was used as the adsorbent and a dashed line shows the case where zeolite with high silica alumina base. As shown in FIG. 2, when the temperature within the tower is less than 150° C., the $SO_2$ concentration at the outlet is raised rapidly and when it is more than 600° C., the concentration is raised as well.

Figure 3:
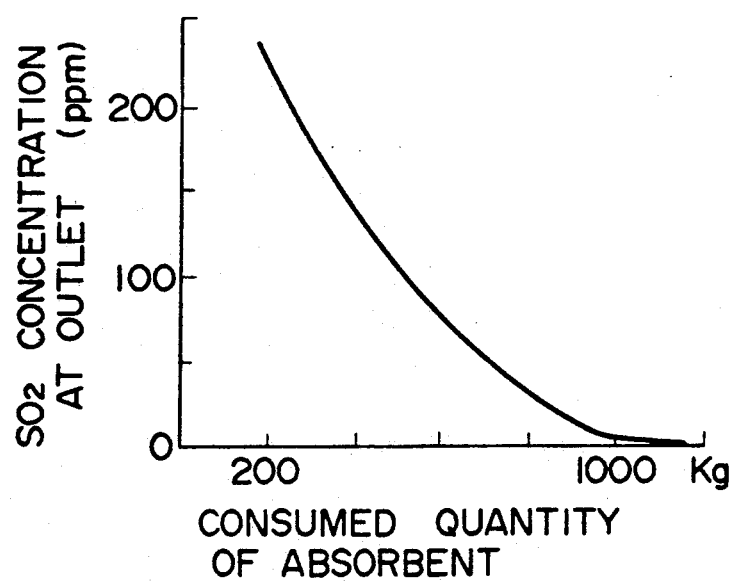
FIG. 3 is another graph showing the consumed quantity of $SO_2$ adsorbent and $SO_2$ concentration at the outlet of the $SO_2$ adsorbing tower in the embodiment illustrated in FIG. 1.

FIG. 3 shows the relation between the $SO_2$ concentration of the exhaust gas at the outlet of the adsorbing tower and the consumed quantity of the adsorbent with the temperature within the absorbing tower set at 500° C. in the embodiment. FIG. 3 shows that, by using 1 ton of the adsorbent, the $SO_2$ concentration of the exhaust gas at the outlet of the adsorbing tower is lowered to 1 ppm.

As described above, in the present embodiment, almost all $SO_2$ can be removed from the exhaust gas discharged and $SO_2$ is changed to gypsum efficiently by small-sized lime-gypsum desulfurizing equipment, and furthermore, the heat efficiency of the plant can be improved by success in overcoming the problem of sulfuric acid dew point corrosion. Although a part of the air containing $SO_2$ desorbed from the $SO_2$ adsorbent is taken out and treated by the lime-gypsum desulfurizing equipment in the present embodiment, the system can be designed so that a part of the exhaust gas staying between the combustor and the adsorbing tower can be taken out, or a part of the exhaust gar or air, each having high $SO_2$ concentration, can be treated by other equipment than the lime-gypsum desulfurizing equipment. Moreover, although the consecutive burning of the combustor is performed by using two $SO_2$ adsorbing towers in this embodiment, the system can be designed so that, by using only one $SO_2$ absorbing tower, the burning of the combustor, adsorption of $SO_2$ from the exhaust gas and desorption of $SO_2$ by air can be achieved intermittently.

Furthermore, any alteration and addition within the range of technological innovation of the present invention is also included in the technological range.

We claim:

1. A method for desulfurizing exhaust gas containing $SO_2$ from a combustor comprising:
   (1) contacting exhaust gas containing $SO_2$ from the combustor with an acid resistant $SO_2$ adsorbent at a temperature in the range from 150° to 600° C. to remove $SO_2$ therefrom and exiting the treated exhaust gas to the atmosphere;
   (2) contacting the $SO_2$ adsorbent containing the adsorbed $SO_2$ with air to desorb the $SO_2$ therein into the air;
   (3) recycling the air containing the $SO_2$ from step (2) to the combustor for use as combustion air resulting in an increase in the $SO_2$ concentration of the $SO_2$ in the exhaust gas from the combustor; and
   (4) wherein the exhaust gas which has not undergone contact with the adsorbent or a part of the air undergone contact with the $SO_2$ adsorbent are taken out of the system.

2. The method of claim 1 wherein the exhaust gas or air containing $SO_2$ is desulfurized in a lime-gypsum desulfurizer.

* * * * *